Patented Jan. 22, 1935

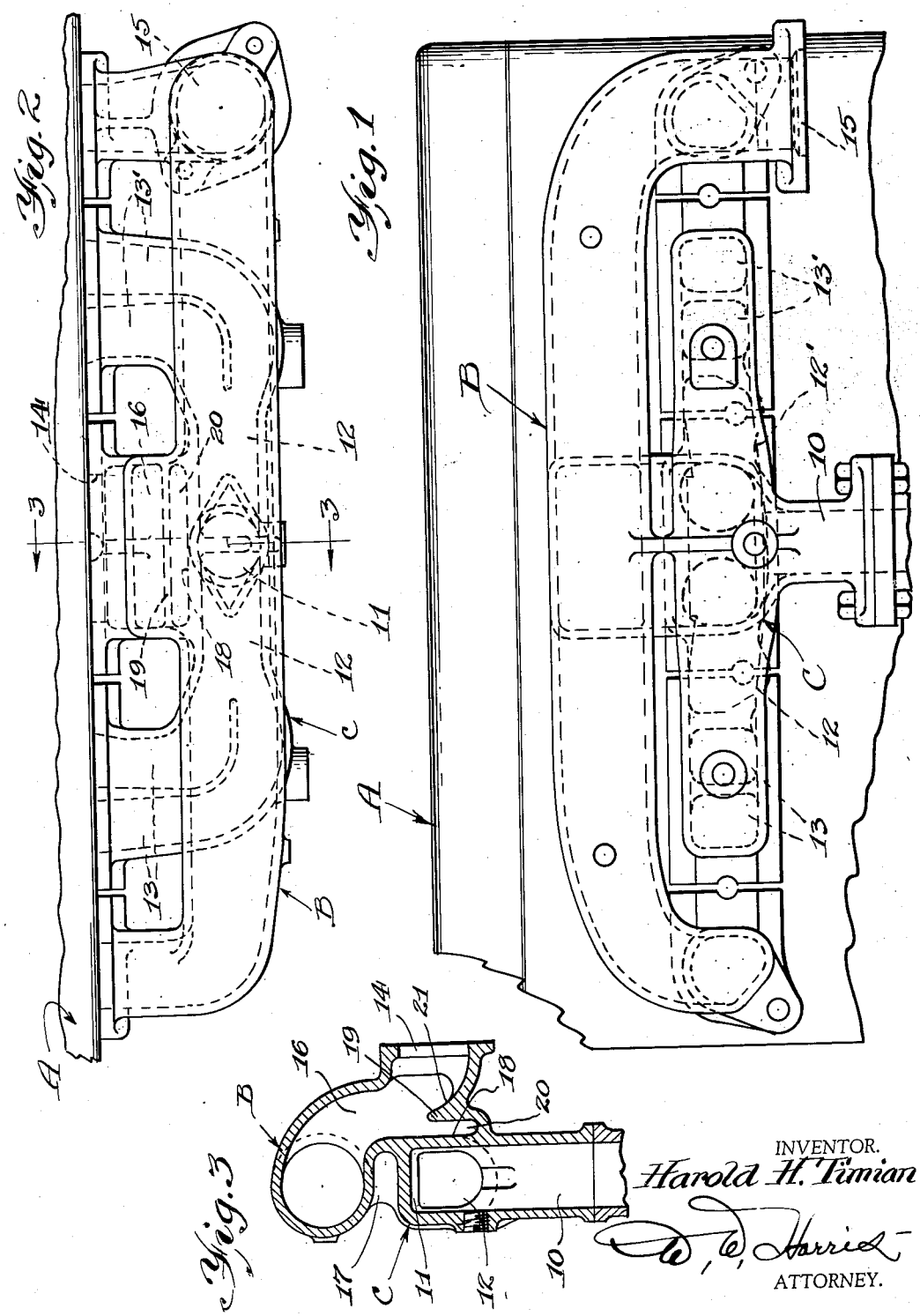

1,988,526

UNITED STATES PATENT OFFICE 1,988,526

ENGINE

Harold H. Timian, Detroit, Mich.

Application May 27, 1933, Serial No. 673,128

10 Claims. (Cl. 123—122)

My invention relates to engines and more particularly to a manifold structure with special reference to that type of manifold employing means for heating the intake gases by means of the exhaust gases.

Much difficulty has been experienced in manifolds of this character in controlling the application of heat to the intake manifold in order to attain the most efficiency from the engine for all engine speeds and for the whole range of engine loading. It is found desirable to apply less heat for the higher range of engine loading than for the relatively lower range of engine loading, but heretofore, it has not been customary to regulate the heating of the intake gases except by the use of a manually controlled valve, and controls of this type have not proved entirely satisfactory since most operators are not sufficiently expert in the technique of engine operation to obtain the maximum of efficiency with manual regulation of the heat control. In most instances, such manual controls are omitted and merely a rough approximation of the ideal is obtained in the application of heat to the intake manifold. In fact, such heating devices as heretofore employed do not cut down the supply of heat for relatively higher engine speeds.

It is an object of my present invention to improve the operating efficiency of an internal combustion engine throughout the entire range of engine loading by providing an improved manifold structure in which the application of heat to the intake manifold portion is automatically controlled or regulated.

Another object of my invention is to provide a positive heat control for an intake manifold in which adjustable valves or other like mechanisms have been eliminated, the control or regulation of such heat application being attained by a construction in which the velocity of the exhaust gases flowing through the exhaust manifold acts to control the quantity of exhaust gases conducted to the heating zone in heat transference relation with respect to the intake manifold in such a way as to apply a maximum of heat for low engine loading and a lesser amount for relatively high engine loading.

Applicant has discovered that by employing a simple baffle a heat control of the desired character may be obtained, the height and location of the baffle with respect to the other cooperating portions of the manifold structure being important factors in obtaining the desired regulation of the heat applied to the intake gases.

For a further understanding of my invention, reference may be had to the accompanying drawing which illustrates one form which my invention may assume, and in which:

Fig. 1 is a fragmentary side elevational view of an internal combustion engine showing a manifold structure embodying the principles of my invention, Fig. 2 is a plan view of the intake manifold structure as shown in Fig. 1, and Fig. 3 is a vertical transverse sectional view of the manifold structure taken on the line 3—3 of Fig. 2.

The manifold structure as shown in the accompanying drawing is adapted for assembly with the usual internal combustion engine A having a plurality of aligned cylinders. This manifold structure comprises an exhaust manifold portion B and an intake manifold portion C, the said engine being supplied with a carburetor of standard construction for connection with the primary fuel mixture conducting means 10 of the intake manifold structure. Said intake manifold preferably includes a distributing chamber 11 communicating with the primary conducting means 10 and the lateral runners 12 and 12' which terminate in suitable port branches 13 and 13' adapted for connection with the engine in the usual manner.

As customary, the exhaust manifold portion is preferably constructed integrally with the intake manifold portion as shown in Figs. 2 and 3, the exhaust gases from the intermediate cylinders being introduced into the exhaust manifold through the exhaust gas inlet opening 14, said exhaust manifold being provided with the usual outlet 15 adapted for connection with the usual type of exhaust pipe (not shown) for conducting the exhaust gases away from the engine. It will be noted that the exhaust manifold extends substantially longitudinally of the engine and this longitudinally extending exhaust gas conducting portion is connected with the exhaust gas inlet opening 14 by means of an intermediate passage 16, the gases in this passage 16 being conducted in heat transference relation with respect to the intake manifold portion for applying heat to the intake gases which are conducted through said intake manifold portion. If desired, a web or fin 17 may be provided for connecting the intake and exhaust manifold portions for the purpose of conducting some heat from the exhaust gases to the intake gases.

It will be noted that a wall 18 of the intake manifold portion is exposed to the gases which are introduced into the exhaust manifold portion through the inlet opening 14, this wall preferably lying in such a way as to be directly exposed to the exhaust gases.

I have provided means for controlling the application of heat to the intake manifold portion through this wall 18 so that a maximum of heat is applied thereto during low load engine operation while a lesser amount of heat is applied thereto during relatively high load engine operation. This is accomplished by providing a baffle 19 which is located between the inlet opening 14 and the intake manifold portion as clearly shown in Fig. 3, this manifold 19 extending inwardly of the exhaust gas conducting passage 16. The baffle is spaced from the wall 18 and the height is such as to permit the exhaust gases to be conducted into the well 20 lying intermediate the baffle and wall 18 during low load engine operation but during relatively high load engine operation the exhaust gases are introduced into this well to a lesser degree.

For a complete understanding of the operation and functioning of this device, it will be necessary to explain the action of the exhaust gases for various conditions of engine loading. During low engine load operation the velocity of the exhaust gases flowing through the exhaust manifold portion is relatively low and the velocity of the exhaust gases is relatively high for relatively high load engine operation. Also, it has been observed that during relatively low load engine operation that the hot exhaust gases only will flow through the exhaust manifold portion, but during high engine load operation it has been noted that a flame streams through the exhaust manifold portion. This flame which is caused to flow through the exhaust passage 16 is, of course, considerably hotter than the mere exhaust gases which are conducted therethrough during low load engine operation and thus if this flame was permitted to be directed against the wall 18 of the intake manifold portion, a greater application of heat to the intake manifold portion would be had at high engine load operation than at low engine load operation, which is a condition that is not desirable for efficient engine operation for all cases of operation. The baffle 19 acts to deflect the flame and to shield the wall 18 of the intake manifold portion in such a way to prevent the flame from striking said wall 18. During low load engine operation when the velocity of the exhaust gases flowing through said exhaust gas conducting portion 16 is relatively low, the said exhaust gases have a tendency to circulate through the well 20 in heat transference relation with the wall 18, but as the engine load is increased the velocity of the product of combustion which is conducted through the passage 16 is progressively increased and the tendency of the said gases to circulate through the well 20 is progressively decreased. In fact, the higher velocities which are present in the exhaust gas passage 16 while the engine is operated at relatively high load creates an increased autoextraction effect tending to prevent the introduction of exhaust gases into the well 20. It has been noted in many tests in which temperatures of the intake gases were recorded that an actual drop of 40 to 50 degrees in temperature was obtained at high load engine operation over the temperatures obtained at low load engine operation. By increasing the height of the baffle 19 over that as shown in the accompanying drawing, it will be noted that relatively lower temperatures may be obtained at high load engine operation than when the baffle 19 is as shown in the drawing. Thus, the height of the baffle 19 has a direct bearing on the control of the heat and the specific height of the baffle for various types of engines may be best obtained by experiment. It has also been noted that the width of the well 20, that is, the spacing of the rear face of the baffle 19 with respect to the wall 18, has a direct bearing on the quantity of heat permitted to flow through the well 20 for conduction in heat transference relation with respect to the intake manifold portion. In particular, a widening of the well 20 over that shown in the accompanying drawing will permit an increased supply of exhaust gases to be conducted into contact with the intake manifold portion during low engine load operation, and thus, by properly positioning the baffle 19 with respect to the wall 18, it will be noted that the desired result can be obtained and in various types of engines the location of this baffle may be best determined by experiment.

The character and contour of the baffle 19 may be varied as desired, the curved portion 21 of the baffle which faces the inlet opening 14 may have any desired curve in order to obtain the desired deflecting characteristics. The thickness of the metal wall connecting the exhaust manifold portion with the intake manifold portion and which forms the floor of the well 20 may be varied as desired for conducting heat from the exhaust manifold portion to said intake manifold portion.

It will be noted that the desired regulation of the heat which is applied to the intake manifold portion for heating the intake gases may be had by the use of a baffle as shown in the accompanying drawing without the use of adjustable valves or other mechanisms as heretofore employed. The present heat control effects a regulation of the quantity of exhaust gases conducted into heat transference relation with the intake manifold portion in response to engine operation. More particularly it may be noted that as the velocity of the exhaust gases going through said passage 16 is increased, the amount of exhaust gases permitted to enter the well 20 in heat transference relation with the intake manifold portion is correspondingly decreased thereby obtaining a heat control which is automatically responsive to engine operation for attaining a maximum of efficiency from engine operation throughout the entire range of operation.

It will be apparent to those skilled in the art to which my invention pertains that various modifications and changes may be made therein without departing from the spirit of my invention or from the scope of the appended claims.

What I claim as my invention is:

1. In a manifold structure for an internal combustion engine, an intake manifold portion, an exhaust manifold portion associated therewith, a baffle wall interposed in the path of the exhaust gas flow and spaced from a wall of the intake manifold portion, said baffle cooperating with the wall of said intake manifold portion to provide a well acting as an intake manifold heater and communicating with the exhaust manifold portion, the exhaust gases conducted through said exhaust manifold portion having different characteristics for different conditions of engine loading and acting to control the flow of gases through said well.

2. In a manifold structure for an internal combustion engine, an intake manifold portion, an exhaust manifold portion, and a fixed baffle extending into said exhaust manifold portion to shield the intake manifold portion, said baffle cooperating with said intake manifold portion to provide a well communicating with said exhaust manifold portion, said exhaust gases being circulated through said well, the quantity of exhaust gas circulated therethrough being regulated by the velocity of the exhaust gas flow in said exhaust gas manifold.

3. In a manifold structure for an internal combustion engine, an intake manifold portion, an exhaust manifold portion having an exhaust gas inlet opening facing a wall of said intake manifold portion, and a fixed baffle extending inwardly of said exhaust manifold portion intermediate said inlet opening and said wall.

4. In a manifold structure for an internal combustion engine, an intake manifold portion, an exhaust manifold portion having an exhaust gas inlet opening facing a wall of said intake manifold portion, and a fixed baffle extending inwardly of said exhaust manifold portion intermediate said inlet opening and said wall, said baffle and wall cooperating to provide a well for the conduction of exhaust gases in heat transference relation with said intake manifold portion.

5. In a manifold structure for an internal combustion engine, an intake manifold portion, an exhaust manifold portion having an exhaust gas inlet opening facing a wall of said intake manifold portion, and a fixed baffle extending inwardly of said exhaust manifold portion intermediate said inlet opening and said wall, said baffle and wall cooperating to provide a well for the conduction of exhaust gases in heat transference relation with said intake manifold portion, the exhaust gas flow through said exhaust manifold portion being variable in velocity under different conditions of engine loading and acting to control the circulation of gases in said well.

6. In a manifold structure for an internal combustion engine, an intake manifold portion, an exhaust manifold portion having an exhaust gas inlet opening facing a wall of said intake manifold portion, and a baffle extending inwardly of said exhaust manifold portion intermediate said inlet opening and said wall, said baffle having a curved wall surface facing the exhaust gas inlet opening whereby to deflect the incoming exhaust gases away from said intake manifold portion.

7. In a manifold structure for an internal combustion engine, an intake manifold portion, an exhaust manifold portion having an exhaust gas inlet opening facing a wall of said intake manifold portion, and a baffle extending inwardly of said exhaust manifold portion intermediate said inlet opening and said wall, said baffle and wall cooperating to provide a well for the conduction of exhaust gases in heat transference relation with said intake manifold portion, said baffle having an exhaust gas deflecting portion acting to deflect the exhaust gases away from said well.

8. In a manifold structure for an internal combustion engine, an intake manifold portion, an exhaust manifold portion having an exhaust gas inlet opening facing a wall of said intake manifold portion, and a baffle extending inwardly of said exhaust manifold portion intermediate said inlet opening and said wall, said baffle and wall cooperating to provide a well for the conduction of exhaust gases in heat transference relation with said intake manifold portion, the exhaust gas flow through said exhaust manifold portion being variable in velocity under different conditions of engine loading and acting to control the circulation of gases in said well, said baffle having an exhaust gas deflecting portion acting to deflect the exhaust gases away from said well, whereby to proportionally decrease the tendency of said exhaust gases to enter said well as the velocity of the gases in said exhaust manifold increases under increasing engine loading.

9. In a manifold structure for an internal combustion engine, an intake manifold portion, an exhaust manifold portion having an exhaust gas inlet opening facing a wall of said intake manifold portion, and a fixed baffle extending inwardly of said exhaust manifold portion intermediate said inlet opening and said wall, said baffle having an exhaust gas deflecting portion acting to regulate the flow of exhaust gas intermediate the baffle and intake manifold portion in response to variations in engine loading.

10. In a manifold structure for an internal combustion engine, an intake manifold portion, an exhaust manifold portion having an exhaust gas inlet facing a wall of said intake manifold portion, and a fixed baffle disposed intermediate said inlet and the wall of said intake manifold portion and cooperating with said wall to define a well through which the exhaust gas is adapted to circulate, the said baffle being constructed and arranged to relatively decrease the quantity of exhaust gas circulated through said well as the velocity of the exhaust gas flow is increased in said exhaust gas manifold.

HAROLD H. TIMIAN.